United States Patent Office 3,416,993
Patented Dec. 17, 1968

3,416,993
USE OF CELLULOSE ETHERS IN PREPARATIVE LAYER CHROMATOGRAPHY
Dietrich Heusser, Darmstadt, and Herbert Halpaap, Jugenheim an der Bergstrasse, Germany, assignors to E. Merck A.G., Darmstadt, Germany
No Drawing. Filed Oct. 11, 1965, Ser. No. 494,867
Claims priority, application Germany, Oct. 24, 1964, M 62,887
26 Claims. (Cl. 161—193)

This invention relates to chromatography, and in particular to novel adsorbent compositions useful in thin layer, and layer systems.

Thin-layer chromatography originally employed solely for analytical purposes has recently attracted increased interest with respect to its use for preparative purposes. The advantages of separating on a surface in comparison with separating in a column are based on the fact that finer-grained and therefore more active adsorbents can be used. In this way, the progress of the separation can be observed visually, and the isolation of the substances can be accomplished with substantially greater accuracy. Additionally, much less mobile phase is required, and the time necessary to carry out the separation process is considerably shortened.

In preparative thin-layer chromatography, which today is simply called "layer chromatography," the process is conducted on carrier or support plates or the like which have dimensions, for example, of 200 x 200 mm., 200 x 400 mm., and 200 x 1000 mm. These support plates are provided with layers thicker than 1 mm., comprising the same adsorbents used in thin-layer chromatography; the thicker the adsorbent layers, the higher is the separation capacity of the plates. With respect to the materials of construction for the supports, glass is generally employed, but it is also possible to employ metals or plastics in the form of films, foils, plates, etc. (For the sake of convenience, the term "plate" will be used hereinafter to designate all the different types of supports.)

Layers having a thickness of 1 mm. and more often exhibit shrinkage phenomena during and/or after drying. There occur extensive cracks, sometimes also having the appearance of scales, which makes these layers relatively useless for separation processes.

The thicker the layer is, the more slowly it dries. When the drying takes place slowly, there is the possibility that the usually admixed fluorescent substances will separate from the adsorbent, thereby resulting in less intense UV-excited fluorescence. To illustrate this phenomenon, a flawless layer of an adsorbent containing zinc silicate (activated with manganese) exhibits, for example, when excited by short-wave ultraviolet light, an intense greenish yellow fluorescence, while a partially separated layer of the same fluoresces on the surface only with a pale-blue light. With respect to the latter, ultraviolet-adsorbing substances show up on such layers indistinctly thereby making it difficult if not impossible, to conduct a sharp separation.

Layers suitable for preparative separation must be homogeneous and should be as dense as possible. The higher the density is, the higher is the concentration of the substance in the adsorbent, and the more distinct the sensitive is the detection of the substance with the aid of the admixed fluorescence indicators. The adsorbent layers furthermore should be capable of retaining the adsorbed substances in as high a concentration as possible, i.e., the diffusion of the substances into the adsorbent should be prevented as much as possible.

An object of this invention therefore is to provide chromatographic layers having the desired properties.

Another object is to provide novel compositions which can be used to make such layers.

Upon further study of the specification and claims other objects and advantages of the present invention will become apparent.

The objects of this invention are attained on the basis of the discovery that it is possible to produce very fine-grained and thus highly active adsorbent layers of silica gel, kieselkuhr, aluminum oxide, magnesium silicate, or cellulose of thicknesses of more than 1 mm. up to about 3 mm., said layers having crack-free surfaces, uniformly distributed fluorescence indicators, and yielding distinctly defined adsorption bands, if there is added to the adsorbent 0.005 to 1% of a cellulose ether, preferably sodium carboxymethylcellulose (formerly called sodium cellulose glycolate). The following table illustrates the general and preferred ranges of the composition in percent by weight.

| | General | Preferred |
|---|---|---|
| Cellulose ether | 0.005–1 | 0.05–0.3 |
| Base adsorbent | 89–99.995 | 92.7–95.95 |
| Binder | 0–7 | 3–5 |
| Fluorescent substance | 0–3 | 1–2 |

In accordance with this invention, all water soluble or water-swellable cellulose ethers can be employed. These compounds sold commercially are white to yellowish white powders which form viscous colloidal solutions in water, with concomitant swelling. The gel solutions are pseudo-plastic.

Examples of such cellulose ethers which are nonionic are: methylcellulose, methylhydroxyethylcellulose, methylethylcellulose, hydroxyethylcellulose, methylhydroxypropylcellulose, and ethylhydroxyethylcellulose. These ethers have various degrees of substitution. For example, in addition to the primary alcohol groups, the secondary alcohol groups can also be etherified. Thus, for example, in methylcellulose, 1.3 to 2 hydroxy groups on the average are etherified per glucose unit.

It is furthermore possible to use ionic ethers such as sodium carboxymethylhydroxyethylcellulose and sodium carboxymethylcellulose. The latter compound is an anionic polyelectrolyte, its etherification degree, as determined by the average number of —$CH_2COONa$ groups per glucoside ring, ranging on the average, between 0.5 and 1.0.

Particularly favorable proved to be a sodium carboxymethylcellulose commercially available under the trade name "AKU-Carboxymethylcellulose Type HZ 858." This readily soluble preparation results in a highly viscous solution of 25–30 degrees Engler at a concentration of 0.5 g./100 ml. (20° C.). The content of sodium carboxymethylcellulose in the preparation amounts to at least 92%, the water content to at most 6%. The etherification degree is 0.8 to 0.9.

The base adsorbent for the new adsorbent composition of this invention can be any of those compounds which are normally utilized, or are utilizable in conventional thin-layer chromatography. For example, a silica gel is preferably employed which has a medium pore size, i.e. having a specific surface of about 500 to 600 m.$^2$/g., a mean pore diameter of about 30 to 50 A., a pore volume of about 0.6 to 0.9 cm.$^3$/g. and approximately the following particle size distribution:

| | Percent by weight |
|---|---|
| More than 30μ | 2 |
| 6–30μ | 63 |
| Less than 6μ | 34 |

The kieselguhr which can be used for the adsorbent in this invention is preferably a kieselguhr which was washed with hydrochloric acid, then roasted and has a particle size distribution wherein about 85% by weight of the particles range between 5 and 30μ.

As the magnesium silicate adsorbent, it is preferred to employ one containing about 15.5% MgO and about 84% SiO$_2$, and having a particle size below 75μ, although all other magnesium silicates conventionally employed for thin-layer chromatography are also useful.

With respect to the aluminum oxide adsorbent which is customarily employed for purposes of chromatography and usable in this invention, it can be basic, neutral, or acidic, and has approximately the following particle size distribution:

| | Percent by weight |
|---|---|
| <26μ | 2 |
| 6–26μ | 69 |
| >6μ | 29 |

With respect to the adsorbents of cellulose powder as conventionally employed for chromatography, and thus suitable for this invention, they have a calcined residue of maximally 0.08% by weight, an average degree of polymerization of about 400 to 500, and a mean molecular chain length of 2 to 20μ. Also usable are micro-crystalline decomposition products of cellulose, as they are already used today for chromatographical purposes and obtainable commercially. Examples of the latter are the microcrystalline products marketed under the trade name Avicel by American Viscose Corp.

These known adsorbents can be, if desired, modified by the incorporation of binders, such as finely divided silicon dioxide having a surface of about 380 m.$^2$/g. and a particle size of 3 to 30 mμ, preferably 3 to 15 mμ, as produced, for example, by thermal hydrolysis of silicon tetrachloride. This finely divided silicon dioxide is added in a quantity of 2 to 7%, more preferably 3 to 5%, to the basic adsorbents. Particularly suitable is the addition of such finely divided silicon dioxide to chromatography adsorbents consisting of silica gel, kieselghur, magnesium silicate, or cellulose powders.

If aluminum oxide is used as the base adsorbent, it is preferred that aluminum hydroxide gel is employed as the binder, this gel being in finely divided form and having a particle size smaller than 1μ, preferably 0.001 to 0.1μ. These gels are the known aluminum hydroxide gels (alumogels), as produced for example from aluminum salt solutions by precipitation with bases; filtration; washing; and gentle drying. In general, the alumogel is advantageously used in a quantity of 2 to 5%, preferably 3% by weight based on the total adsorbent composition.

In order to separate colorless components which absorb UV, it is possible to incorporate in the adsorbent composition of this invention an inorganic fluorescent substance, such as, for example, manganese-activated zinc silicate, magnesium tungstate, or cadmium halogen phosphate; tin-activated calcium phosphate; manganese- or manganese-lead-activated calcium silicate; or antimony- or antimony-manganese activated calcium halogen phosphate, etc. For colorless components absorbing in the ultraviolet below 220 mμ, it is also possible to use an organic fluorescent substance such as, for example, sodium 3-hydroxy-pyrene-5,8,10-trisulfonate, sodium 3,5-dihydroxy-pyrene-6,10-disulfonate, or morin, etc. (c.f. R. Tschesche, G. Biernoth, and G. Wulff, Jour. Chromatography, vol. 12, 1963, p. 342).

The inorganic fluorescent substances effect, in case of components absorbing in the medium ultraviolet range starting with 230 mμ, when radiated with short-wave ultravoilet light (254 mμ), a decrease in the intensity of, or a cancelling out of the fluorescence, so that the bands of adsorbate stand out dark from the fluorescent surface.

The organic fluorescent substances, on the other hand, effect an increase in the intensity of the fluorescence on the adsorbate bands under the influence of long-wave ultraviolet light (366 mμ) so that they stand out brighter from the fluorescing surface.

It is here also to be noted that in an application having the same assignee and a co-inventor of this invention, calcium sulfate hemihydrate is taught to be a crack-retarding additive for chromatographic layers. In the present invention, however, since cellulose ethers prevent the formation of gypsum crystals in aqueous suspension, the use of calcium sulfate hemihydrate is of no beneficial consequence.

For producing the layer it is necessary to mix the individual components homogeneously beforehand (adsorbent, sodium carboxymethylcellulose, fluorescence indicator, and perhaps additional binder). This is done most advantageously with the aid of a so-called high-speed mixer. For forming the desired coating consistency, about 60 to 300 parts of water are incorporated with 100 parts solid.

By means of the novel adsorbent composition of this invention, it is possible to conduct fine separation on a preparative scale on highly active adsorbent layers of preferably at least 0.2 mm. up to about 3 mm. thickness. Furthermore, this invention results in the treatment of larger amounts of substance, better detection, and improved separations as compared with the previously known adsorbent compositions.

With respect to separation effects, in particular, the novel adsorbent compositions of this invention exhibit substantial advantages as compared with adsorbent compositions without the addition of a cellulose ether. The strip width of the applied test substance is reduced by 10% when adding 0.01% of sodium carboxymethylcellulose to the silica gel and by 22% when adding 0.1%, as compared to the strip width of an adsorbent composition on the basis of silica gel, but without the addition of sodium carboxymethylcellulose. Furthermore, the lengths of run are reduced by the addition of sodium carboxymethylcellulose, which indicates an increase in the activity of the adsorbent layer.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

In a high-speed mixer, 939 g. of silica gel of medium pore size, 50 g. finely divided silicon dioxide, 10 g. manganese-activated zinc silicate and 1 g. sodium carboxymethylcellulose are mixed for 3 minutes. 800 g. of this mixture are shaken with 1600 ml. water to form a suspension of about 2000 ml. 400 ml. portions of the suspension are distributed on a glass plate of 200 x 1000 mm. positioned in a mold frame to form a layer of 2 mm. in height. After predrying in air, the frame is removed, and the layer is subsequently activated at 140° C. for 3 hours in a drying chamber. The thus-obtained adsorbent layer has advantageous properties as described above.

Example 2

In a high-speed mixer, 987 g. aluminum oxide, 10 g. manganese-activated zinc silicate, and 3 g. sodium carboxymethylcellulose are mixed for 3 minutes. 800 g. of this mixture are agitated with 900 ml. water to form a suspension. 400 ml. portions of the suspension are distributed on a glass plate of 200 x 1000 mm. positioned in a frame to form a layer of 2 mm. After predrying in air, the frame is removed, and the layer is subsequently activated in a drying chamber for 3 hours at 140° C. The thus-obtained layer is also endowed with the advantageous properties described above.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. An adsorbent composition for layer chromatography comprising an intimate mixture of, in percent by weight, 0.005–1% of a water soluble or water swellable cellulose ether and substantially the remainder of said composition being a chromatography adsorbent selected from the group consisting of silica gel, kieselguhr, and magnesium silicate, aluminum oxide, and cellulose.

2. A chromatographic plate comprising a support plate and superimposed thereon a uniform layer of about up to 3 mm. in thickness of a composition as defined by claim 1.

3. A composition as defined by claim 1 wherein the cellulose ether is methylcellulose, methylhydroxyethylcellulose, methylethylcellulose, ethylhydroxyethylcellulose, sodium carboxymethylhydroxyethylcellulose or sodium carboxymethylcellulose.

4. A chromatographic plate comprising a support plate and superimposed thereon a uniform layer of about up to 3 mm. in thickness of a composition as defined by claim 3.

5. A composition as defined by claim 2, further comprising a small quantity of a fluorescent substance.

6. A chromatographic plate comprising a support plate and superimposed thereon a uniform layer of about up to 3 mm. in thickness of a composition as defined by claim 5.

7. A composition as defined by claim 1 wherein said cellulose ether is sodium carboxymethylcellulose.

8. A composition as defined by claim 7 wherein said sodium carboxymethylcellulose has an etherification degree of 0.8–0.9.

9. A chromatographic plate comprising a support plate and superimposed thereon a uniform layer of about up to 3 mm. in thickness of a composition as defined by claim 7.

10. A chromatographic plate as defined by claim 9 wherein said sodium carboxymethylcellulose has an etherification degree of 0.8–0.9.

11. A composition as defined by claim 7, further comprising a small quantity of a fluorescent substance.

12. A chromatographic plate comprising a support plate and superimposed thereon a uniform layer of about up to 3 mm. in thickness of a composition as defined by claim 11.

13. A composition as defined by claim 1, further comprising a small quantity of a fluorescent substance.

14. A chromatographic plate comprising a support plate and superimposed thereon a uniform layer of about up to 3 mm. in thickness of a composition as defined by claim 13.

15. An adsorbent composition for layer chromatography comprising an intimate mixture of, in percent by weight, 0.005–1% of a cellulose ether, 2–7% of a binder consisting of silicon dioxide having a particle size of 3–30 m$\mu$, and substantially the remainder of said composition being of a chromatography adsorbent selected from the group consisting of silica gel, kieselguhr, magnesium silicate, and cellulose.

16. A chromatographic plate comprising a support plate and superimposed thereon a uniform layer of about up to 3 mm. in thickness of a composition as defined by claim 15.

17. A composition as defined by claim 15 wherein said cellulose ether is sodium carboxymethylcellulose.

18. A chromatographic plate comprising a support plate and superimposed thereon a uniform layer of about up to 3 mm. in thickness of a composition as defined by claim 17.

19. A composition as defined by claim 17, further comprising a small quantity of a fluorescent substance.

20. A chromatographic plate comprising a support plate and superimposed thereon a uniform layer of about up to 3 mm. in thickness of a composition as defined by claim 19.

21. An adsorbent composition for layer chromatography comprising an intimate mixture of, in percent by weight, 0.005–1% of a cellulose ether, 2–5% of a binder consisting of an alumogel having a particle size less than 1 micron, and substantially the remainder of said composition being of a chromatography aluminum oxide.

22. A chromatographic plate comprising a support plate and superimposed thereon a uniform layer of about up to 3 mm. in thickness of a composition as defined by claim 21.

23. A chromatographic plate comprising a support plate and superimposed thereon a uniform layer of about up to 3 mm. in thickness of a composition as defined by claim 24.

24. A composition as defined by claim 21 wherein said cellulose ether is sodium carboxymethylcellulose.

25. A composition as defined by claim 24, further comprising a small quantity of a fluorescent substance.

26. A chromatographic plate comprising a support plate and superimposed thereon a uniform layer of about up to 3 mm. in thickness of a composition as defined by claim 25.

References Cited

UNITED STATES PATENTS 3,303,043  2/1967  Halpaap et al. _____ 117—33.5

TOBIAS E. LEVOW, *Primary Examiner.*

J. COOPER, *Assistant Examiner.*

U.S. Cl. X.R.

161—410; 252—408, 428